Aug. 21, 1956 R. L. LONGINI 2,760,096

TELEVISION PICKUP TUBE

Filed Jan. 29, 1952

WITNESSES:

E. A. McCloskey

Leon M. Garman

INVENTOR

Richard L. Longini.

BY

F. E. Browder

ATTORNEY

United States Patent Office 2,760,096

Patented Aug. 21, 1956

2,760,096

TELEVISION PICKUP TUBE

Richard L. Longini, Forest Hills, Pa., assignor to Westinghouse Electric Corporation, East Pittsburgh, Pa., a corporation of Pennsylvania Application January 29, 1952, Serial No. 268,765

10 Claims. (Cl. 313—65)

Figures 1, 2:
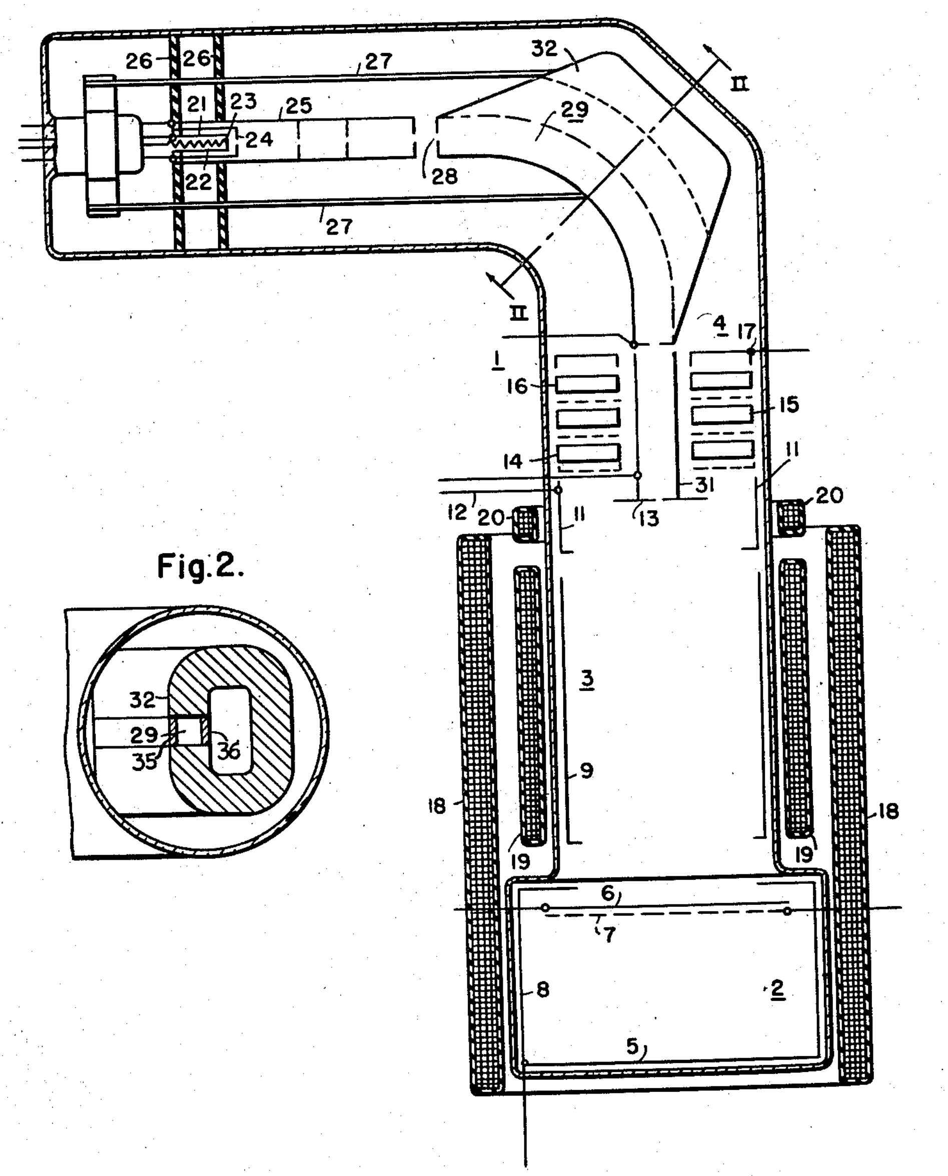

My invention relates to television picture pick-up tubes and, in particular, relates to an arrangement for producing a scanning beam in which the electrons all have the same velocity at the time they reach the vicinity of the image screen which it scans.

Most present-day television pick-up tubes, such for example as the image orthicon, have an image screen in which electric charges are stored with a distribution over the screen surface which corresponds to the light distribution over the surface of the picture which they are transmitting. This image screen is scanned, point-by-point, by a beam of electrons which are nominally all of the same velocity. Points on the image screen corresponding to dark areas in the picture are arranged to have a potential slightly negative relative to that of the cathode from which the beam-electrons originate so when the beam is directed toward them, all beam-electrons supposedly are repelled to a collector electrode in the tube. At screen points which correspond to light areas of the picture, however, the potential is more positive because of the electric charge mentioned above, and some of the beam-electrons are absorbed to neutralize the charge, thereby making the current to the collector electrode less than when the scanning beam was directed at a dark area of the picture. The fluctuations of current to the collector electrode thus correspond to the light-pattern of the picture and are transmitted to the receiver to reproduce the light-pattern on a screen there in ways too well known to require detailed description here.

However, under light-intensity and other picture conditions which must be handled in television practice, the maximum positive potential at the lightest point on the screen is only of the order of a volt above an area corresponding to complete blackness. Actually, also, the electrons of the scanning beam have velocities which differ in accordance with the Maxwellian distribution of their thermal energies corresponding to their origin at a cathode temperature of around 900° C. This means that some five per cent of the electrons leave the cathode with velocities corresponding to 0.3 of a volt, and if one of these approaches a dark spot on the image screen, by which it would be repelled to the collector electrode but for its thermal energy, it will instead discharge itself on the image screen and register it as a spot having a light intensity about ten per cent of that of the brightest spot in the picture. This obviously shows that the thermal energies actually present in the beam electrons are of the same order of magnitude as the electric energy variations over the picture screen and are sufficient to cause a substantial misrepresentation of the picture.

Furthermore, even on a picture area corresponding to a light spot, the last part of the charging is done only by these higher energy electrons. Other electrons are useless for this purpose but have the bad effect of introducing noise.

One object of my invention is accordingly to provide a television pick-up tube having a scanning beam of electrons having a substantially uniform velocity.

Another object of my invention is to provide an improved television pick-up tube.

Still another object of my invention is to provide a system for producing an electric current which shall vary in time in accurate correspondence with the space-distribution of an electric potential, such variations being free from distortion arising from thermal effects.

A further object of my invention is to produce an improved electron scanning beam.

Other objects of my invention will become apparent upon reading the following description taken in connection with the drawings, in which:

Figure 1 is a schematic plan view, partly in section, of an Image Orthicon provided with a cathode ray gun embodying the principles of my invention; and Fig. 2 is a section along the line II—II of Fig. 1.

Referring in detail to the drawings, I illustrate the principles of my invention as applied to the cathode ray gun of an Image Orthicon although it is applicable to cathode-ray guns used in other types of television pick-up tubes such as the Iconoscope, and in other tubes employing electron beam scanning. The Image Orthicon comprises an evacuated enclosure 1, which may be of glass, having an image chamber 2, a scanning chamber 3 and an electron multiplier section 4. The image chamber 2 is of a structure well-known in the art and needs no description here beyond the statement that a conventional photoelectric or other radiation responsive emissive coating forms a screen 5 on which the picture to be transmitted is focussed by a suitable optical system (not shown) outside the tube. A thin glass membrane 6 faced with a metallic screen 7 is supported parallel to screen 5. The screens 5, 6 and 7 are provided with leads so that desired voltages may be impressed upon them, and the inner wall of the chamber is preferably given a conducting coating 8 which is electrically connected to screen 5. The scanning chamber 3, which is cylindrical, is likewise provided with a conductive coating 9 and is similar to present day Image Orthicon structure. At the region remote from image chamber 2, the scanning chamber 3 is provided with a separate coating 11, the electrical potential of which may be fixed by a lead-in 12. In the central axis of coating 11 is positioned the outlet-disc 13 of the electron-gun of my invention. Beyond the disc 13 are located dynodes 14, 15, 16 and an output electrode 17, of conventional structure which it is believed superfluous to describe, each provided with a lead-in by which its potential may be fixed at will. A focussing coil 18, deflecting coils 19 and an alignment coil 20 ensure that an electron beam issuing from the orifice in disc 13 scans screen 6 with a centered trace of small area.

Since the structure so far described is conventional today, it is believed sufficient in further description of it to say that the light-field focussed on screen 5 generates an electron image which is accelerated into impact with glass screen 6 and that such impact results in the storage, as a result of secondary emission, of positive electric charges on screen 6 which duplicate in space-distribution the light-field incident on the photoelectric screen 5. The screen 6 is scanned point-by-point with the electron-beam emanating from electron-gun outlet-disc 13, and during its movement the electron-beam is robbed, at any particular instant, of enough electrons to neutralize the positive charge at the point on screen 6 upon which it is then incident. The remnant of the electrons in the electron-beam return to the outlet-disc 13 and thence by external circuits to the electron-gun cathode. These electrons constitute a current which varies in time in correspondence with the space-distribution of positive charge on screen 6, and hence with the light-distribution in the picture focussed on photoelectric input screen 5. The use of a current varying in time in correspondence with light distribution on a picture input screen to control a television transmiter is conventional in present-day television systems, and is believed to require no further description here.

In Fig. 1 the electrons not abstracted by screen 6 from the electron-beam at any instant follow paths which carry them to the outlet-disc 13 where they produce secondary electrons. An electric field imposed by suitable external circuits (not shown) between first dynode 14 and outlet-disc 13, attracts these electrons into incidence with the former. Their impact therewith is made violent enough so that each incident electron knocks out of dynode 14 a plurality of secondary electrons. In short the dynodes 14, 15 and 16 and output-anode 17 perform the usual functions of a conventional electron multiplier, and their configuration and functioning, being known in the art and forming no part of my present invention, are believed to require no further description here.

The electron gun which comprises the major structural elements which differentiate my invention from the prior art comprises an electron-emissive cathode which may be of conventional type made up of a metal cylinder 21 enclosing an electric heater-element 22 and having a saucer-like end coated with thermionically-emissive material 23. The cylinder 21 is surrounded by a metal sleeve 24 having a fine central opening in its end, and provided with leads sealed through the wall of container 1 by which a positive potential may be impressed on it relative to emissive cathode 23. A metal sleeve 25 provided with three orificed diaphragms encloses the end-portion of sleeve 24 and coacts with the opening in sleeve 24 to form a well-known type of electron lens to focus electrons from emissive cathode 23 into an electron beam. The members 21, 24 and 25 are held in suitable alignment by discs 26 of insulating material supported by rods 27 from the stem of enclosure 1, through which suitable leads are sealed to impress the desired potentials on said members in a manner well-known in the electron-tube art. This electrode system projects a beam of electrons through the orifice at the outer end of cylinder 25.

Aligned so that an orifice 28 in its end-wall receives the above-mentioned electron-beam is a metal channel 29 curved in a circular arc which may subtend 90 degrees and be of rectangular cross-section. Beyond its outer end is a straight tubular portion 31 through which the electrons travel and which passes between the dynode set 14, 15, 16 and terminates in the orificed end disc 13.

The top and bottom walls of the curved channel 29 are formed by the pole-faces of a magnet 32 as appears more clearly in Fig. 2, thereby producing a uniform magnetic field normal to the plane of Fig. 1 throughout the curved portion of channel 29. Side walls 35 and 36 are provided to enclose the curved channel portion 29. An electron entering the orifice 28 encounters this magnetic field and is caused to move in a path along the arc of a circle the radius of which is inversely proportional to its linear velocity.

While all the electrons entering the orifice 28 have approximately the same direction they will, as previously pointed out, have velocities that vary about a mean value, and they will accordingly follow circular arcs through the magnetic field which vary correspondingly from a mean radius. To accentuate their differences of velocity the potential of the walls of element 29 is only several volts positive with respect to the cathode thus causing the electrons to move slowly. The magnetic field is therefore correspondingly weak. After issuing from the field of magnet 32, the electrons will follow in the straight portion of the duct rectilinear paths which are tangent to the various circular arcs they followed in the magnet field. The straight portion 31 of the duct may be given a considerably elevated voltage relative to the curved portion 29.

By varying the potential of the orifice 28 relative to cathode 23, the electrons travelling one of these arcs, preferably that of mean radius, can be caused to issue through the orifice in plate 13, the other electrons striking the walls of the duct and being returned by external circuits to cathode 23. Thus only electrons having a narrow range of (e. g. the mean) velocity issue from the orifice in plate 13 to form the beam which scans glass screen 6 as previously described. The difficulty from heterogeneous velocities in the scanning beam, which have been pointed out above, are thus eliminated and the variation with time of the electron flow returned to plate 13 is a true representation of the potential distribution in the electron-picture on screen 6. Correspondingly the time variations in the control current issuing to the transmitter from output-eletrode 17 of the electron-multiplier group is a true replica of the light distribution in the picture focussed on photoelectric input-screen 5.

While I have described the use of a magnetic field for causing the electrons entering orifice 28 to follow curved paths, it will be evident to those skilled in the electronics art that an electric field in the plane of Fig. 1 and transverse to the path traversed by the electrons entering orifice 28 will cause a similar curvature of path within the curved channel 29, and since the degree of curvature will depend on the velocity with which a particular electron passes orifice 28, such an arrangement will also insure that only electrons of a particular velocity range arrive at the outlet-orifice in the duct-end disc 13. The construction of a modified structure utilizing such a transverse electric field instead of the magnetic field in curved channel 29 is believed to be well within the skill of an electronics engineer. Adjustment of the strength of the transverse field will of course insure that it is the electrons of mean velocity that pass through the output orifice in end plate 13 where this is desired.

Because all electrons projected from end-disc 13 are equally useful in the neutralizing of the charged image, the beam intensity can be greatly reduced—possibly by as much as a factor of 20. Thus the noise limit of the tube—which is the noise of the beam—may be reduced by a factor of $\sqrt{20}$. This permits resolving signals this much smaller with the same signal to noise ratio as previous tubes.

I claim as my invention:

1. A picture pick-up device comprising means for storing a space-distribution of electric charges corresponding to said picture, means for scanning said space-distribution with a beam of electrically-charged particles, said means for scanning including a gun for projecting a concentrated stream of said particles, duct means for receiving said stream of particles, said duct having a curved portion with a magnetic field perpendicular to its radius of curvature and an end wall in said duct having a narrow orifice through which a portion of said beam issues.

2. A picture pick-up device comprising means for storing a space distribution of electric charges corresponding to said picture, means for scanning said space-distribution with a beam of electrically-charged particles, said means for scanning including a gun for projecting a concentrated stream of said particles, duct means for receiving said stream of particles, said duct having a curved portion with a magnetic field perpendicular to its radius of curvature and a straight portion, said straight portion having an end wall having a narrow orifice through which said beam issues from said duct.

3. A picture pick-up device comprising means for storing a space-distribution of electric charges, means for scanning said space-distribution with a beam of electrically-charged particles of substantially single velocity, said means for scanning including a gun for projecting a concentrated stream of said particles of varying velocities, a wall positioned transverse to said beam having a narrow orifice through which a portion of said beam of substantially single velocity particles issues, and means for deflecting said particles an amount dependent on the velocity of said particles positioned between said gun and said wall.

4. A picture reproducing system comprising means for storing a space-distribution of electric charges, means for scanning said space-distribution with a beam of electrically-charged particles, said means for scanning including a gun for projecting a concentrated stream of said particles, means for producing a magnetic field transverse to said stream for deflecting said stream an amount dependent on velocity of said particles, and a wall having a contracted orifice from which particles within said stream of substantially single velocity issue.

5. A picture reproducing system comprising means for storing a space-distribution of electric charges, means for scanning said space-distribution with a beam of electrically-charged particles, said means for scanning including in the order named a gun for projecting a concentrated stream of said particles and means for freeing said stream of particles of other than substantially a single velocity.

6. A picture reproducing system comprising means for storing a space-distribution of electric charges, means for scanning said space-distribution with a beam of electrically-charged particles, said means for scanning including a gun for projecting a concentrated stream of said particles, duct means for receiving said stream of particles, said duct having a curved portion with a magnetic field perpendicular to its radius of curvature of said curved portion and an end wall in said duct having a narrow orifice from which said beam issues, and means for periodically deflecting said beam after it issues from said orifice.

7. A picture reproducing system comprising means for storing a space-distribution of electric charges, means for scanning said space-distribution with a beam of electrically-charged particles, said means for scanning including a gun for projecting a concentrated stream of said particles, duct means for receiving said stream of particles, said duct means having a curved portion with a transverse electric field to said stream and a straight portion, a wall in said duct having a narrow orifice from which a portion of said beam issues and means for periodically deflecting said beam positioned between said end wall and said storing means.

8. An electron discharge device comprising means for storing a space distribution of electric charges, means for scanning said space distribution with a beam of electrically charged particles of substantially uniform velocity, said means for scanning comprising a gun for generating and projecting a concentrated stream of particles of varying velocities, means for freeing said stream of particles from other than those of a single velocity, and means to periodically deflect said stream of single velocity particles.

9. An electron discharge device comprising means for storing a space distribution of electric charges, means for scanning said space distribution with a beam of electrically charged particles of substantially single velocity, means for periodically deflecting said stream of particles to scan said storing means and means for collecting the electrons returned from said storing means to derive a signal representative of the charge on said storing means.

10. An image device comprising a thermionic electron gun for generating an electron beam, duct means associated with said electron gun into which said electron beam is directed, an inlet end wall in said duct means having an aperture therein for receiving said electron beam, an outlet end wall in said duct means having an aperture therein, means for producing a constant field positioned between said end walls to deflect the electrons within said beam according to their velocity so that only that portion of said electron beam having a substantially single velocity passes through the aperture in said outlet end wall, an electrode on which said single velocity beam impinges having a space distribution of electric charge, and means for producing an alternating field positioned between said electrode and said outlet end wall for scanning said electrode with said single velocity beam.

References Cited in the file of this patent

UNITED STATES PATENTS

| | | |
|---|---|---|
| 2,227,015 | Schlesinger et al. | Dec. 31, 1940 |
| 2,256,462 | Iams | Sept. 16, 1941 |
| 2,374,205 | Hoskins | Apr. 24, 1945 |
| 2,531,050 | Hutter | Nov. 21, 1950 |
| 2,543,859 | Long | Mar. 6, 1951 |
| 2,545,958 | Kerst | Mar. 20, 1951 |
| 2,551,544 | Nier et al. | May 1, 1951 |